(12) United States Patent
Rafferty et al.

(10) Patent No.: US 12,511,911 B2
(45) Date of Patent: Dec. 30, 2025

(54) SYSTEM AND METHOD FOR DETECTING SPILLAGE FROM MACHINES

(71) Applicant: Caterpillar Inc., Deerfield, IL (US)

(72) Inventors: Jonathan Edmund Rafferty, Pascoe Vale (AU); Jyoti Prakash Mishra, Brunswick West (AU); Aaron Francis Westbury, Wynyard (AU)

(73) Assignee: Caterpillar Inc., Peoria, IL (US)

( * ) Notice: Subject to any disclaimer, the term of this patent is extended or adjusted under 35 U.S.C. 154(b) by 128 days.

(21) Appl. No.: 18/612,789

(22) Filed: Mar. 21, 2024

(65) Prior Publication Data

US 2025/0299494 A1   Sep. 25, 2025

(51) Int. Cl.
*G06V 20/56* (2022.01)
*E02F 9/26* (2006.01)

(52) U.S. Cl.
CPC .............. *G06V 20/56* (2022.01); *E02F 9/261* (2013.01)

(58) Field of Classification Search
CPC ................................ G03V 20/56; E02F 9/261
USPC ......................................................... 340/540
See application file for complete search history.

(56) References Cited

U.S. PATENT DOCUMENTS

| | | | |
|---|---|---|---|
| 9,145,661 B1 * | 9/2015 | Jensen | E02F 9/265 |
| 11,235,756 B2 | 2/2022 | Kim | |
| 11,256,932 B2 | 2/2022 | Hasegawa | |
| 11,723,307 B2 * | 8/2023 | Meier | G01H 1/00 |
| | | | 701/50 |
| 2009/0306852 A1 * | 12/2009 | Ikeda | B60W 50/14 |
| | | | 701/36 |
| 2012/0215378 A1 * | 8/2012 | Sprock | G06Q 10/0639 |
| | | | 701/2 |
| 2017/0193646 A1 * | 7/2017 | Wang | G06T 7/00 |
| 2018/0215452 A1 * | 8/2018 | Zielonka | G01S 7/415 |
| 2018/0245311 A1 * | 8/2018 | Shike | E02F 9/20 |
| 2018/0262724 A1 * | 9/2018 | Ross | G06V 20/40 |
| 2020/0011033 A1 * | 1/2020 | Sherlock | E02F 9/262 |
| 2020/0026302 A1 * | 1/2020 | Wolcott | G06F 18/251 |
| 2020/0180608 A1 * | 6/2020 | Kim | B60W 30/16 |
| 2020/0211300 A1 * | 7/2020 | Helms | H04Q 9/00 |
| 2021/0056322 A1 * | 2/2021 | Hasegawa | G01S 13/08 |
| 2022/0101279 A1 | 3/2022 | Anderson | |
| 2022/0163361 A1 * | 5/2022 | Thiel | G01F 1/74 |
| 2022/0180299 A1 * | 6/2022 | Väin | B65G 1/1371 |

(Continued)

FOREIGN PATENT DOCUMENTS

| | | |
|---|---|---|
| CN | 217560775 U | 11/2022 |
| CN | 116052106 A | 5/2023 |

*Primary Examiner* — Brian A Zimmerman
*Assistant Examiner* — Thang D Tran

(57) ABSTRACT

Spillage of material from one or more machines is managed by a worksite management system. A machine includes a camera and a ranging apparatus (such as a light detection and ranging device) to detect material coming from a machine indicating a spill. In some examples, the machine further has one or more inertial measurement units and/or load cell sensors that are used to confirm whether or not a spill has occurred. The worksite management system receives spill notifications from one or more machines and uses the spill notifications to warn other machines of the spill. The worksite management system can also use the spill notifications to control the movement of the machines to avoid the spill.

20 Claims, 4 Drawing Sheets

(56) References Cited

U.S. PATENT DOCUMENTS

| | | | |
|---|---|---|---|
| 2023/0172301 A1* | 6/2023 | Kenward | A42B 3/044 |
| | | | 2/410 |
| 2023/0247939 A1* | 8/2023 | Vandike | A01D 41/1217 |
| | | | 340/603 |
| 2024/0085521 A1* | 3/2024 | Maeyama | G01S 13/931 |
| 2024/0190478 A1* | 6/2024 | Kume | B60W 60/00274 |
| 2024/0302198 A1* | 9/2024 | Missotten | A01D 43/087 |

\* cited by examiner

SYSTEM AND METHOD FOR DETECTING SPILLAGE FROM MACHINES

TECHNICAL FIELD

The present disclosure relates generally to system and method for detecting spillage from a machine hauling a material. More particularly, the present disclosure relates to a worksite management system that is configured to manage the movement of two or more machines on a worksite, considering the probability that a spill may occur from a bucket of at least one of those machines,

BACKGROUND

Machines, such as earth-moving vehicles or hauling trucks, move along various paths in a worksite. The paths may be between a dump site and a load site, from a load site to a charging site, and other locations. In some situations, these paths may change over time. For example, the machine may be used in an excavation operation of a mine. As dirt or material is removed from the worksite, the load site where the machine is used may change. Sometimes, the machines at a worksite are managed and controlled by a Fleet Management System (FMS). An FMS receives data from various machines to provide information or instructions to the machines. When managing a worksite, it can be helpful to monitor the conditions of various paths traveled by machines being used at the worksite. For example, if there is an issue with a path such as a spill of material that affects the travelability of the path, the FMS can manage maintenance/cleanup operations, as well as, potentially instruct machines to change the manner in which the machines are moving.

Some efforts have been made to detect spills of materials. One approach for detecting a spill of material from a vehicle is described in U.S. Pat. No. 11,256,932 to Kim Dong Hyuk (hereinafter referred to as "the '932 patent"). The '932 patent describes a system that uses a falling load detector on a vehicle following another vehicle. According to the disclosure of the '932 patent, sensors on the trailing vehicle are configured to detect a falling load from a vehicle in front of the trailing vehicle (i.e., the leading or lead vehicle). The system of the '932 patent use a camera that captures images from the leading vehicle in combination with ranging detectors such as a light detection and ranging (LIDAR) device or radio detection and ranging (RADAR) device. However, the system of the '932 has some limitations. For example, the detection of a spill requires the use of the second, trailing vehicle. In another example, the accuracy of the detection of the spill is highly dependent on how close the trailing vehicle is to the leading vehicle. As the distance between the vehicles increases, the sensors used to detect the spill can become less accurate, potentially missing the detection of spills. The accuracy of the system of the '932 patent also depends on having the leading vehicle within a line of sight of the cameras of the trailing vehicle. If the trailing vehicle and the leading vehicle are at different elevations or if the sensors of the trailing vehicle are not directed towards the leading vehicle (e.g., the leading vehicle is moving up a hill while the trailing vehicle is behind on level ground), the sensors of the trailing vehicle may not detect a spill from the leading vehicle.

SUMMARY

In an aspect of the present disclosure, a machine includes a bucket for hauling a material, an inertial measurement unit configured to detect a movement of the machine in one or more axes of travel and output an inertial measurement output, a first spillage detector comprising a first camera mounted on the machine, wherein the first camera is directed along a first viewing axis, wherein the first spillage detector is configured to output a video signal, a second spillage detector comprising a ranging device for detecting at least a portion of the material spilled from the bucket by detecting an object at a range, wherein the second spillage detector outputs a ranging signal, a spillage detection system in communication with the inertial measurement unit, the first spillage detector, and the second spillage detector,, the spillage detection system comprising a spillage module configured to receive the video signal, the ranging signal, and the inertial measurement output, a spillage determination module configured to determine if a spill of a portion of the material has occurred based on the video signal and the ranging signal, and a spill notification module configured to output a spill indication notification upon the spillage determination module determining that the spill of the portion of the material from the bucket has occurred.

In an additional aspect of the present disclosure, a worksite management system for managing machine movements on a worksite includes a spillage receiving module configured to receive a spill indication notification from a first machine of a plurality of machines operating at the worksite, wherein the spill indication notification comprises a time of a spill of material from the first machine and a location of the spill of the material, wherein the first machine comprises a spillage detection system comprising a spillage module configured to receive a video signal generated by a camera mounted on the machine, a ranging signal generated by a ranging apparatus mounted on the machine, and an inertial measurement output generated by an inertial measurement unit mounted on the machine, a spillage determination module configured to determine if the spill of the material has occurred based on the video signal and the ranging signal, and a spill notification module configured output the spill indication notification upon the spillage determination module determining that the spill of the material from has occurred, and a spillage site notification module configured to transmit, wirelessly via a transceiver, a site spill message to a second machine of the plurality of machines to warn the second machine of the spill of the material, wherein the second machine is proximate to or traveling along a path in which the spill occurred.

In a still further aspect of the present disclosure, a method of managing machine movements on a worksite includes receiving a spill indication notification from a first machine of a plurality of machines operating at the worksite, wherein the spill indication notification comprises a time of a spill of material from the first machine and a location of the spill of the material, wherein the spill indication notification is generated by receiving a video signal generated by a camera mounted on the machine, a ranging signal generated by a ranging apparatus mounted on the machine, and an inertial measurement output generated by an inertial measurement unit mounted on the machine, determining if the spill of the material has occurred based on the video signal and the ranging signal, and upon determining that the spill of the material has occurred, outputting the spill indication notification, and transmitting a site spill message to a second machine of the plurality of machines to warn the second machine of the spill of the material, wherein the second machine is proximate to or traveling along a path in which the spill of the material has occurred.

DETAILED DESCRIPTION

Figure 1:
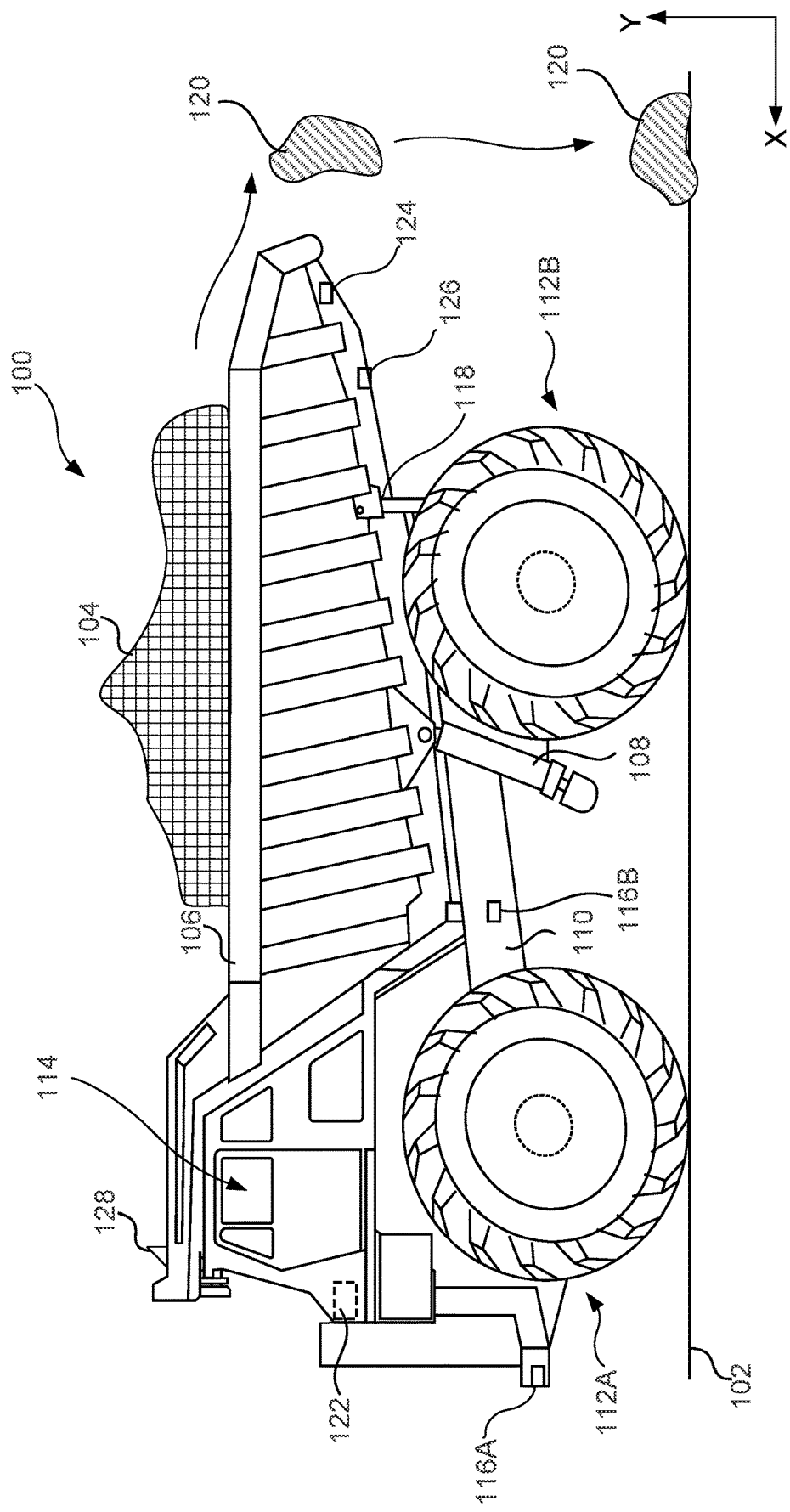
FIG. 1 illustrates a side view of a machine within an XYZ coordinate system as one example suitable for carrying out the principles discussed in the present disclosure.

Wherever possible, the same reference numbers will be used throughout the drawings to refer to same or like parts. FIG. 1 illustrates a side view of a machine 100 within an XY coordinate system as one example suitable for carrying out the principles discussed in the present disclosure. Machines, such as the machine 100, may be mobile equipment used to travel as well as perform work at worksites such as, but not limited to, landscaping, construction, mining, and load hauling. The exemplary machine 100 travels along a path 102, typically from a source to a destination within a worksite. In one implementation as illustrated, the machine 100 is a hauling machine that hauls a load 104 of material within or from a worksite within a mining operation. As used herein, "path" is used to describe a portion of a worksite onto which the machine 100 (and other machines) travel from a source to a destination. The load 104 may be various materials placed within a bucket 106 of the machine 100 to be transported from one location of the worksite to another location of the worksite. For example, the load 104 may be excavated ore or other earthen materials from an excavation area along the path 102.

The load 104 may be transported by the machine 100 by placing the load 104 into the bucket 106 at an excavation area of the worksite and then transported by the machine 100 along the path 102 to a dump site where the load 104 is offloaded from the machine 100 using a hydraulic lifter 108 to rotate the bucket 106. The machine 100 can thereafter return to the excavation area to be reloaded. It should be noted that while a large haul truck is described herein, the present disclosure is not limited to the machine 100 being a haul truck, as the machine 100 may be any vehicle used on a worksite or a machine that carries a load to and from different locations within a worksite, examples of which include an articulated truck, an off-highway truck, an on-highway dump truck, a tractor scraper, or any other machine known in the art and configured to perform an operation on a surface of the earth, or transport material. Alternatively, the machine 100 may be an off-highway truck, on-highway truck, a dump truck, an articulated truck, a loader, an excavator, a pipe layer, or a motor grader. In other implementations, the machine 100 need not haul any specific type of load and may be any machine associated with various industrial applications including, but not limited to, mining, agriculture, forestry, construction, and other industrial applications.

Continuing with FIG. 1, the machine 100 includes a frame 110 to which the bucket 106 and other components of the machine 100 may be attached. The machine 100 further includes traction devices 112A and 112B. The traction devices 112A and 112B are illustrated as wheels with tires, although tracks or other mechanisms for engagement with the ground along the path 102 are possible. The machine 100 further includes a cab 114, which is an enclosed or partially enclosed space in which one or more operators (not shown) of the machine 100 may be stationed to operate the machine 100. To assist the operator (and/or a control unit if the machine 100 is a fully or partially autonomously controlled vehicle), the machine 100 includes inertial measurement units (IMU) 116A and 116B. The IMUs 116A and 116B are devices that measure the inertia of the machine 100 as accelerations in various directions (or vectors). In some examples, the IMUs 116A and 116B can provide linear and rotational acceleration, providing data to determine a yaw rate, pitch rate, and roll rate. The measurements may be used by the operator or controllers of the machine 100 as feedback to estimate the roll, pitch, yaw, or quaternion of the machine 100. Accelerometers of the IMUs 116A and 116B can be used to sense applied accelerations in one or more axes of travel (direction) of the machine 100 and output an inertial measurement output. In some examples, the IMUs 116A and 116B may be attached at various locations of the machine 100 to detect movements at various locations of the machine 100. The machine 100 may further include a load cell sensor 118. The load cell sensor 118 is used to measure the weight of the material in the load 104. For example, prior to, during, and after loading the material into the bucket 106, the weight measured by the load cell sensor 118 can be used to determine how much material in the load 104 has been loaded. As the machine 100 travels along the path 102, a portion of the material of the load 104 may exit the bucket 106 and fall from the machine 100 onto the path 102 as a spill 120. The present disclosure is not limited to any particular reason for the spill 120. As mentioned above, the spill 120 falling from the bucket 106 of the machine 100 can present issues such as fouling the path 102, potentially preventing other machines from using the path. To detect the spill 120, the machine 100 includes a spillage detection system 122.

The spillage detection system 122 is a computer system that uses various sensors on the machine 100 to detect the spill 120. In some examples, the spillage detection system 122 uses one or more spillage detector (or sensors) that are used to detect that the spill 120 occurred. In some examples, the spillage detectors include, but are not limited to, a camera 124 and a ranging apparatus, such as a ranging detector 126. The camera 124 can be mounted to the frame 110 at a viewing axis (i.e., the direction to which the lens of the camera is directed) or the bucket 106 at a location whereby the camera can detect images (either as single images or in video form) from various locations around the machine 100. For example, the camera 124 can point towards a rear of the machine 100 so that spills of the load 104 falling from the rear of the machine 100 can be detected and stored as an image or video. Additional cameras (not shown) may be installed at other locations and in other locations of the machine 100 to view other areas surrounding the machine 100, thus detecting spills emanating from various locations of the bucket 106. The present disclosure is not limited to any particular number or location of the camera 124.

The ranging detector 126 can be a ranging device such as a light detection and ranging (LIDAR) device or radio detection and ranging (RADAR) device. The ranging detector 126 can be used to detect various aspects of the spill 120, such as, but not limited to, the distance of the spill 120 from the vehicle, the material that comprises the spill 120, and other aspects. For example, solid material may result in different data collected by the ranging detector 126 than loose material such as sand or dust. Thus, while the camera 124 may be used to detect images of the spill 120, the ranging detector 126 can be used to detect aspects of the spill 120 such as the distance, a type of the material, and other aspects. The present disclosure is not limited to any particular number or location of the ranging detector 126.

The spillage detection system 122 can also use additional spillage detectors such as, but not limited to, the one or more of the IMUs 116, the load cell sensor 118, along with the camera 124, and the ranging detector 126 to determine that the spill 120 may have occurred and to verify the determination of the spill 120. For example, the spillage detection system 122 may receive a weight reading from the load cell sensor 118. The weight reading may be different than a previously received weight reading received from the load cell sensor 118, indicating the potential that the spill 120 occurred. However, various factors other than the spill 120 may cause a variability of the weight reading. For example, the machine 100 may encounter a bump or small indention in the road whereby a portion of the load 104 is temporarily and partially lifted from the machine 100.

The weight reading may indicate a change in the weight of the load 104, potentially indicating that a spill 120 occurred. In another example, the camera 124 may detect a large object coming from the rear of the machine 100. The spillage detection system 122 can receive a video signal from the camera 124 indicating the potential presence of the spill 120. The spillage detection system 122 can use the video signal from the camera 124, either alone or in conjunction with other data, to determine if the spill 120 did occur. The spillage detection system 122 can request a weight reading or use a weight reading from the load cell sensor 118 to verify that the weight of the load 104 has changed, indicating a spill 120. In another example, the ranging detector 126 may transmit a ranging signal to the spillage detection system 122 indicating a spill 120. As with the examples provided above, the spillage detection system 122 may use a second input, such as the IMU 116, the load cell sensor 118, and/or the camera 124 to verify that the spill 120 occurred. The spillage detection system 122 can provide information about the spill 120, such as a location, an amount of the mass of the spill 120, a time the spill 120, and other information, to a worksite management system (described in FIG. 3, below) using a transceiver 128 of the machine 100. The transceiver 128, as well as other aspects of the spillage detection system 122 on a component level are described in reference to FIG. 2.

Figure 2:
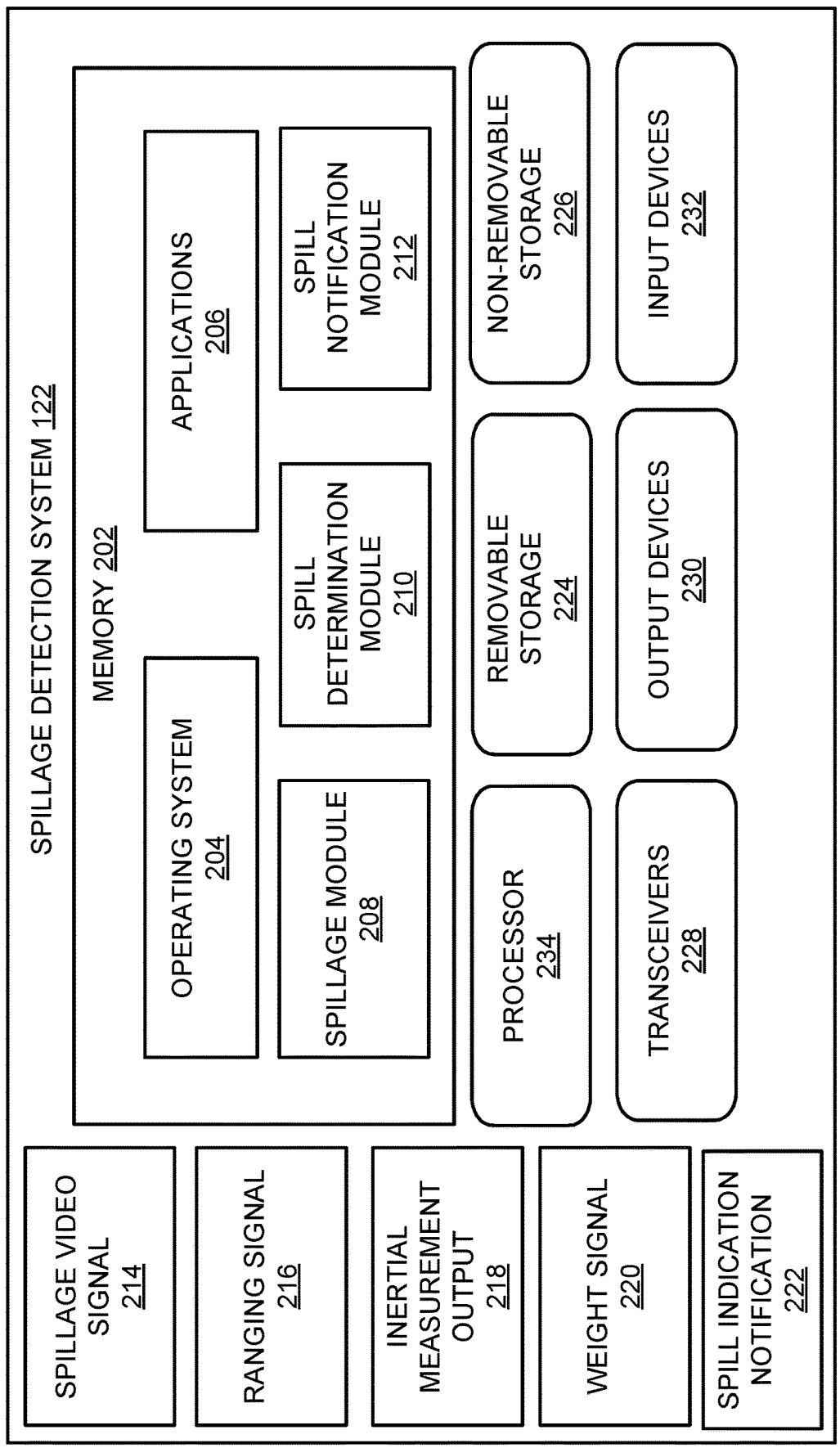
FIG. 2 illustrates components of a spillage detection system, in accordance with one or more examples of the present disclosure.

FIG. 2 depicts a component level view of the spillage detection system 122 for use with the systems and methods described herein, in accordance with various examples of the present disclosure. The spillage detection system 122 could be any device capable of providing the functionality associated with the systems and methods described herein. The spillage detection system 122 can comprise several components to execute the above-mentioned functions. The spillage detection system 122 may be comprised of hardware, software, or various combinations thereof. As discussed below, the spillage detection system 122 can comprise memory 202 including an operating system (OS) 204 and one or more standard applications 206 that, when executed by the OS 204, provide a spillage module 208, a spillage determination module 210, and a spill notification module 212.

In some examples, the spillage module 208 is configured to receive one or more signals or outputs from one or more sensors of the machine 100 of FIG. 1. The signals can include a video signal 214 from the camera 124, a ranging signal 216 from the ranging detector 126, an inertial measurement output 218 from the IMUs 116, and/or a weight signal 220 from the load cell sensor 118. The spillage determination module 210 determines if a spill 120 occurs using the video signal 214, the ranging signal 216, the inertial measurement output 218, and/or the weight signal 220, examples of which are provided above. If the spillage determination module 210 determines a spill 120 occurs, the spill notification module 212 provides a spill indication notification 222 to a worksite management system (described in FIG. 3, below).

The spillage detection system 122 can also comprise one or more of removable storage 224, non-removable storage 226, transceiver(s) 228, output device(s) 230, and input device(s) 232. In various implementations, the memory 202 can be volatile (such as random access memory (RAM)), non-volatile (such as read only memory (ROM), flash memory, etc.), or some combination of the two. The memory 202 can also include the OS 204. The OS 204 varies depending on the manufacturer of the spillage detection system 122. The OS 204 contains the modules and software that support basic functions of the spillage detection system 122, such as scheduling tasks, executing applications, and controlling peripherals. The OS 204 can also enable the spillage detection system 122 to send and retrieve other data and perform other functions.

The spillage detection system 122 can also comprise one or more processors 234. In some implementations, the processor(s) 234 can be one or more central processing units (CPUs), graphics processing units (GPUs), both CPU and GPU, or any other combinations and numbers of processing units. The spillage detection system 122 may also include additional data storage devices (removable and/or non-removable) such as, for example, magnetic disks, optical disks, or tape. Such additional storage is illustrated in FIG. 2 by removable storage 224 and non-removable storage 226.

Non-transitory computer-readable media may include volatile and nonvolatile, removable and non-removable tangible, physical media implemented in technology for storage of information, such as computer readable instructions, data structures, program modules, or other data. The memory 202, removable storage 224, and non-removable storage 226 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the spillage detection system 122. Any such non-transitory computer-readable media may be part of the spillage detection system 122 or may be a separate database, databank, remote server, or cloud-based server.

In some implementations, the transceiver(s) 228 include any transceivers known in the art. In some examples, the transceiver(s) 228 can include wireless modem(s) to facilitate wireless connectivity with other components (e.g., between the spillage detection system 122 and a worksite management system), the Internet, and/or an intranet. The transceiver(s) 228 can enable the spillage detection system 122 to connect to multiple networks including, but not limited to 2G, 3G, 4G, 5G, and Wi-Fi networks. The transceiver(s) 228 can also include one or more transceivers to enable the spillage detection system 122 to connect to future (e.g., 6G) networks, Internet-of-Things (IoT), machine-to machine (M2M), and other current and future networks.

The transceiver(s) 228 may also include one or more radio transceivers that perform the function of transmitting and receiving radio frequency communications via an antenna (e.g., Wi-Fi or Bluetooth®). In other examples, the transceiver(s) 228 may include wired communication components, such as a wired modem or Ethernet port, for communicating via one or more wired networks. The transceiver(s) 228 can enable the spillage detection system 122 to facilitate audio and video calls, download files, access web applications, and provide other communications associated with the systems and methods, described above.

In some implementations, the output device(s) 230 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 230 can also include speakers, or similar devices, to play sounds or ringtones when an audio call or video call is received. Output device(s) 230 can also include ports for one or more peripheral devices, such as headphones, peripheral speakers, or a peripheral display.

In various implementations, input device(s) 232 include any input devices known in the art. For example, the input device(s) 232 may include a camera, a microphone, or a keyboard/keypad. The input device(s) 232 can include a touch-sensitive display or a keyboard to enable users to enter data and make requests and receive responses via web applications (e.g., in a web browser), make audio and video calls, and use the standard applications 206, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 232 and an output device 230.

Figure 3:
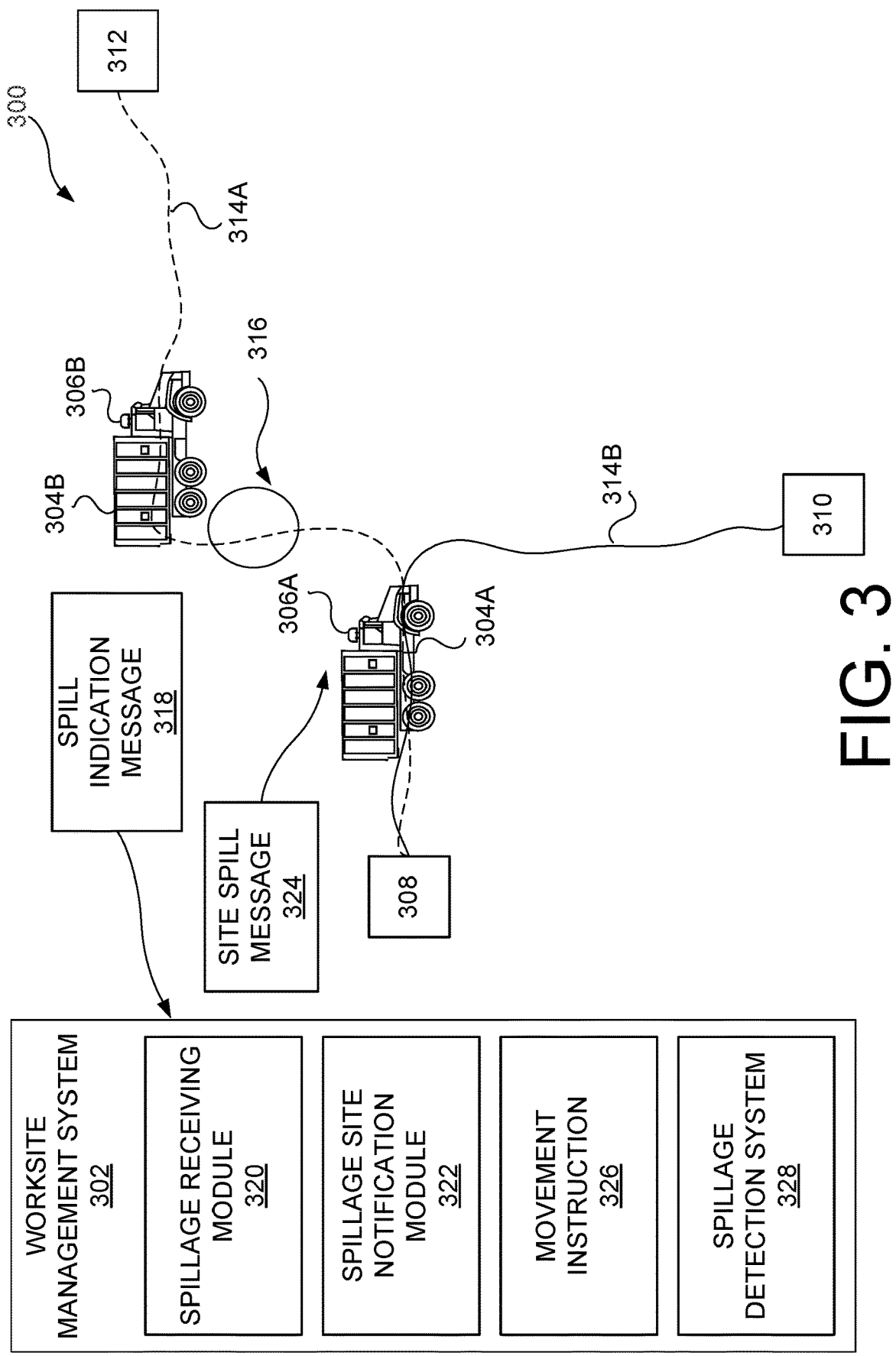
FIG. 3 illustrates a worksite management system for managing machines based on spill notifications at a worksite, in accordance with various examples of the present disclosure.

FIG. 3 illustrates a worksite 300 that uses a worksite management system 302 to manage the movement of machines at the worksite 300 as well as coordinate other activities such as the cleanup of spills, in accordance with one or more examples of the present disclosure. In some examples, the worksite management system 302 is a computer-based system implemented in a component level manner similar to the spillage detection system 122 of FIG. 2. Illustrated in FIG. 3 are machines 304A and 304B (hereinafter individually referred to as "the machine 304A," "the machine 304B," and collectively as "the machines 304"). Each of the machines 304 includes a transceiver to receive and transmit between the machines 304 and the worksite management system 302, illustrated as a transceiver 306A on the machine 304A and a transceiver 306B on the machine 304B.

The worksite includes locations 308, 310, and 312, though it should be noted that the locations 308, 310, and 312 are merely exemplary and illustrative in nature, as more or fewer locations may be used and be within the scope of the present disclosure. In FIG. 3, the location 308 is an origination location for the machine 304 and the locations 310 and 312 are destination locations for the machine 304. As used herein, an "origination location" is merely used to describe a starting point and is not specific to any particular operational use, such as, but not limited to, a storage area, parking area, and other locations. As used herein, a "destination location" is merely used to describe a location to which the machines 304 travel. Examples of destination locations can include a loading area, dumping area, fuel bay, and/or a charge station. The present disclosure is not limited to any particular type of destination location. Further, a destination location may also be an origination location. For example, the machines 304 may perform some operation at the location 310 and then travel to the location 312. In this example, the location 310 may be a destination location when the machines 304 arrive at the location 310 and an origination location when the machines 304 leave the location 310 and travel to another location, such as the location 312.

Illustrated in FIG. 3 are paths 314A (dashed line) and 314B (solid line) at the worksite 300. In FIG. 3, the machines 304 A and 304B are traveling to the location 312 to offload a haul in each of the machines 304. In an example of the implementation of the worksite management system 302, the machine 304B detects that a spill occurred at a location 316 along the path 314A. The machine 304B transmits a spill indication message 318 to a spillage receiving module 320 of the worksite management system 302. Upon receipt of the spill indication message 318, a spillage site notification module 322 transmits a site spill message 324 to other machines at the worksite 300, such as the machine 304A. In some cases, the spillage site notification module 322 can transmit the site spill message 324 and other data wirelessly using a transceiver. The site spill message 324 provides information about the time of the spill and the location of the spill to the other machines. In some examples, the site spill message 324 also includes a movement instruction 326. The movement instruction 326 may be a command to the machine 304A to use the path 314B rather than the path 314A to avoid the location 316 of the spill. In still further examples, the worksite management system 302 can include a spillage detection system 328. In this example, the spillage detection system 328 can act as a sitewide spillage detection system, as some machines may not have their own spillage detection systems 122 installed. Rather than implementing a spillage detection system at each machine, or in addition to implementing a spillage detection system on each machine, the spillage detection system 328 can receive sensor data from the various machines 304 at the worksite 300 and determine when a spill occurs.

Figure 4:
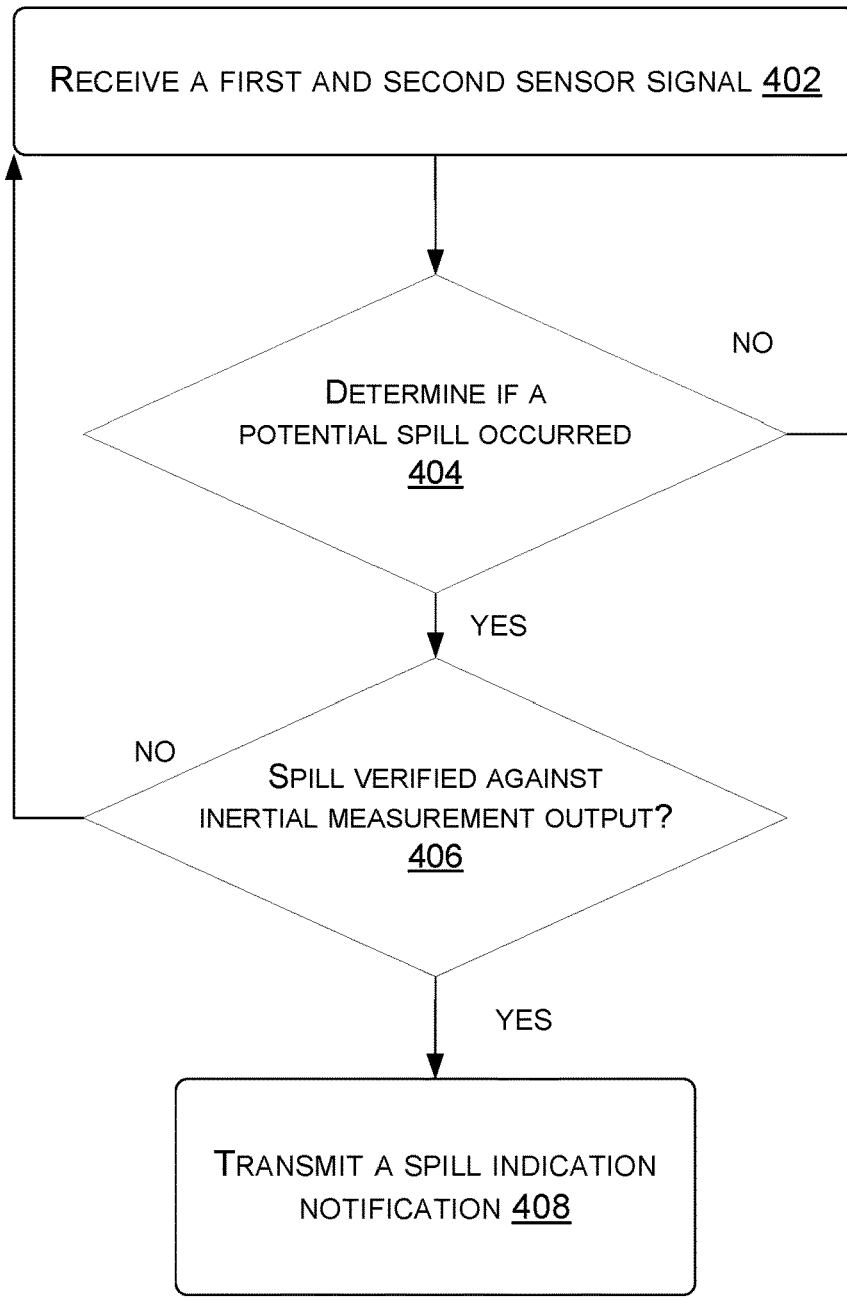
FIG. 4 is a flowchart depicting a method of determining a spill and managing a worksite based on a spill notification, in accordance with various examples described herein.

FIG. 4 is a flowchart depicting a method 400 of detecting spills to manage machines at a worksite, in accordance with various examples described herein. The method 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, and data structures that perform functions and/or implement particular abstract data types. The order in which the operations are described is not intended to be construed as a limitation, and any number of the described blocks can be omitted and/or combined in any order and/or in parallel to implement the processes. Additionally, although the method 400 is described in terms of the spillage detection system 122, as mentioned above, the spillage detection system 328 may perform similar functions in addition to or in lieu of the spillage detection system 122, including the steps described in the method 400.

At step 402, the spillage detection system 122 receives a first and second sensor signal indicating a potential spill. As noted above, in some examples, one sensor signal may be used to detect that a potential spill occurred. For example, the spillage detection system 122 may receive a weight reading from the load cell sensor 118. The weight reading may be different than a previously received weight reading received from the load cell sensor 118, indicating the potential that the spill 120 occurred. However, various factors other than the spill 120 may cause a variability of the weight reading. For example, the machine 100 may encounter a bump or small indention in the road whereby a portion of the load 104 is temporarily and partially lifted from the machine 100. To verify that the different reading indicates that the spill 120 occurred, examples of the present disclosure may use a second sensor signal. In one example, the sensor signals can be combinations of the video signal 214, the ranging signal 216, the inertial measurement output 218, and the weight signal 220. It should be noted that the present disclosure is not limited to any particular combination of sensor signal nor to a limitation of two sensor signals, as various combinations and additional sensor signals may be used and are considered to be within the scope of the present disclosure.

At step 404, the spillage determination module 210 determines if a spill occurred. In some examples, the determination uses the two sensor signals received at step 402 as a spillage verification. For example, the weight signal 220 may indicate a change in the weight of the load 104, potentially indicating that a spill 120 occurred. In another example, the camera 124 may detect a large object coming from the rear of the machine 100. The spillage detection system 122 can receive the video signal 214 from the camera 124 indicating the presence of the spill 120. The spillage detection system 122 can request a weight reading or use a weight reading from the load cell sensor 118 to verify that the weight of the load 104 has changed, indicating a spill 120. In another example, the ranging detector 126 may transmit a ranging signal to the spillage detection system 122 indicating a spill 120. As with the examples provided above, the spillage detection system 122 may use a second input, such as the IMU 116, the load cell sensor 118, and/or the camera 124 to verify that the spill 120 occurred.

The spillage detection system 122, at step 404, can also commence a spillage identification process by analyzing various inputs to identify the material. In one example, the spillage detection system 122 can compare the video signal 214 against a plurality of images to find an image that resembles (i.e., matches) the video signal 214. Once an image matches the video signal 214, the identification can be based on the image match. For example, if the material is rock, the images can consist of images of rocks of different shapes, colors, and/or sizes. In another example, the spillage detection system 122 or the spillage detection system 328, at step 404, can also perform an identification process to identify the material by using the ranging detector 126 to determine a density of the material. For example, the video signal 214 from the camera 124 can indicate the presence of a large mass, or object, of material. However, the ranging signal generated by the ranging detector 126 can indicate that the object density shows that the material is actually loosely associated (i.e., sparsely packed), indicating that the material forming the object may be sand, dirt, or dust.

If at step 404 the spillage determination module 210 determines no spill occurred, the method 400 returns to step 402. If at step 404 the spillage determination module 210 determines that the spill 120 occurred, at step 406, the spillage determination module 210 can perform an additional verification operation by checking the spill 120 against an additional sensor signal, such as the inertial measurement output 218. For example, if the video signal 214 and the ranging signal 216 were used at step 404, the spillage determination module 210 may use an additional sensor signal to perform an additional verification in a manner similar to step 404. If at step 406 the spillage determination module 210 determines no spill occurred, the method returns to step 402.

If at step 406 the spillage determination module 210 determines the spill 120 did occur, at step 408, the spillage determination module 210 transmits the spill indication notification 222 to other work vehicles and/or to the worksite management system 302. In some examples, the worksite management system 302 is configured to output a site spill message to a second machine of a plurality of machines to warn the second machine of the spill of the material, wherein the second machine is proximate to or traveling along a path in which the spill occurred. The site spill message 324 can also be transmitted to a spill cleaning or recovery system to instruct the spill cleaning or recovery system to remove or recover the spill. When the spill is removed or recovered (e.g., "cleaned up"), the worksite management system 302 can also transmit a site spill clear message to the plurality of machines indicating that the spill has been removed or recovered and to recommence using the work path. The worksite management system 302 can also transmit the movement instruction 326 to a second machine based on the spill of the material, wherein the movement instruction comprises a command to the second machine to move to a second work path, to slow down a speed of the second machine, or for the second machine to travel along a second portion of the path to avoid the spill.

Those of ordinary skill in the field will also appreciate that the principles of this disclosure are not limited to the specific examples discussed or illustrated in the figures.

INDUSTRIAL APPLICABILITY

The present disclosure provides for a spillage detection system that can be used to coordinate machine movements at a worksite. As machines haul material from one location to another, there may be potential for material being hauled to fall off (or spill from) the machine. This spill may affect not only the ability for other machines to move in the area of the spill but may also indicate a potential loss of payload, and consequently, loss of money or revenue if the spilled material is to be used or the spill slows down the movement of other machines. Thus, in some examples, the detection of a spill and use that detection as a means for instructing the movement of other machines or cleanup vehicles can help maintain the viability of the worksite and/or reduce economic loss.

In some examples, a machine 100 uses two or more sensors to determine if a spill occurred. In some examples, multiple sensors may be used to reduce a probability of a false notice of a spill. For example, a weight detector that detects the weight of material in a bucket of a machine may indicate a lower weight if the machine goes over a bump in the road. In another example, a camera may indicate a large mass, or object, coming from the back of the bucket. However, the object may be a dust cloud, sand, or other material that may not represent a spill from the machine. Thus, in some embodiments, when a sensor output indicates a spill, the machine 100 uses the spillage determination module 210 to verify that a spill occurred using a second sensor output.

The time, location, and material of the spill can be transmitted to a worksite management system 302 that uses the information to manage the movement of other machines (or vehicles) as well as coordinate cleanup operations to remove the spill from the worksite. In addition to the detection of spills, the data provided by the examples described herein can be used for worksite remediation or future operations. For example, the worksite management system 302 can determine that more than one spill is occurring at a certain location. The worksite management system 302 can transmit an output to a worksite review team to go the site of the multiple spills to determine if there is an issue with the path being used, such as objects or defects (e.g., a hole or large bump), that is causing the spills. Thus, if a spill cleaning or recovery system is used, the worksite management system 302 can provide instructs to review specific locations of spills. In another example, the worksite review team can use data from the machines themselves to help determine if there is an issue with the path 102 that may be causing spills. For example, the data from the IMUs 116 of the machines can be used to determine if a hill or crest traveled by the machines is causing material to fall out of the bucket of the machine. In these examples, the data can be used to institute a speed limit on the machines through the location of the multiple spills or modify the path itself to reduce the probability of a spill occurring.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A machine, comprising:
   a bucket for hauling a material;
   an inertial measurement unit configured to detect a movement of the machine in one or more axes of travel and output an inertial measurement output;
   a first spillage detector comprising a first camera mounted on the machine, wherein the first camera is directed along a first viewing axis, wherein the first spillage detector is configured to output a video signal;
   a second spillage detector comprising a ranging device for detecting at least a portion of the material spilled from the bucket by detecting an object at a range, wherein the second spillage detector outputs a ranging signal;
   a spillage detection system in communication with the inertial measurement unit, the first spillage detector, and the second spillage detector, the spillage detection system comprising:
      a spillage module configured to receive the video signal, the ranging signal, and the inertial measurement output;
      a spillage determination module configured to determine if a spill of a portion of the material has occurred based on the video signal and the ranging signal; and
      a spill notification module configured to output a spill indication notification upon the spillage determination module determining that the spill of the portion of the material from the bucket has occurred.

2. The machine of claim 1, wherein the spillage determination module is configured to verify the determination that the spill of the portion of the material by:
   receiving the inertial measurement output from the spillage module;
   comparing the inertial measurement output against a second inertial measurement output received by the spillage module at a time prior to the inertial measurement output; and
   outputting a spillage verification upon verifying that a comparison between the inertial measurement output and the second inertial measurement output indicates the spill of the portion of the material.

3. The machine of claim 1, wherein the spillage detection system is configured to:
   commence a spillage determination process by analyzing the video signal; and
   determining that the video signal indicates the object falling from the bucket of the machine.

4. The machine of claim 1, wherein the spillage detection system is configured to:
   commence a spillage determination process by analyzing the ranging signal; and
   determining that the ranging signal indicates the object falling from the bucket of the machine.

5. The machine of claim 1 further comprising a load cell sensor configured to detect a weight of the material in the bucket of the machine after determining that the spill of the portion of the material from the bucket has occurred, wherein the spillage detection system is configured to determine an amount of the portion of the material spilled from the bucket based on the weight.

6. The machine of claim 1, wherein the spillage detection system is further configured to wirelessly, via a transceiver, transmit the spill indication notification to at least one of a second machine and a worksite management system.

7. The machine of claim 6, wherein the spill indication notification comprises a time and location of the spill of the portion of the material.

8. The machine of claim 1 further comprising a second inertial measurement unit configured to output a second inertial measurement output, wherein the spillage detection system is configured to compare the inertial measurement output and the second inertial measurement output to verify the determination that the portion of the material has spilled from the bucket of the machine.

9. A worksite management system for managing machine movements on a worksite, comprising:
   a spillage receiving module configured to receive a spill indication notification from a first machine of a plurality of machines operating at the worksite, wherein the spill indication notification comprises a time of a spill of material from the first machine and a location of the spill of the material, wherein the first machine comprises a spillage detection system comprising:
- a spillage module configured to receive a video signal generated by a camera mounted on the first machine of the plurality of machines, a ranging signal generated by a ranging apparatus mounted on the first machine of the plurality of machines, and an inertial measurement output generated by an inertial measurement unit mounted on the first machine of the plurality of machines;
- a spillage determination module configured to determine if the spill of the material has occurred based on the video signal and the ranging signal; and
- a spill notification module configured output the spill indication notification upon the spillage determination module determining that the spill of the material from has occurred; and
- a spillage site notification module configured to transmit, wirelessly via a transceiver, a site spill message to a second machine of the plurality of machines to warn the second machine of the spill of the material, wherein the second machine is proximate to or traveling along a path in which the spill occurred.

10. The worksite management system of claim 9, wherein the spillage site notification module is further configured to transmit, via the transceiver, a movement instruction to the second machine based on the spill of the material, wherein the movement instruction comprises a command to the second machine to move to a second work path, to slow down a speed of the second machine, or for the second machine to travel along a second portion of the path to avoid the spill.

11. The worksite management system of claim 9, further configured to perform an identification process to identify the material.

12. The worksite management system of claim 11, wherein the identification process to identify the material comprises:
- comparing the video signal against a plurality of images;
- finding an image match between the video signal and one of the plurality of images; and
- identifying the material based on finding the image match.

13. The worksite management system of claim 12, the site spill message further comprises an identification of the material.

14. The worksite management system of claim 9, wherein the site spill message is transmitted, via the transceiver, to a spill cleaning or recovery system to instruct the spill cleaning or recovery system to remove or recover the spill.

15. The worksite management system of claim 9, wherein the spillage site notification module is configured to transmit, via the transceiver, a site spill clear message to the plurality of machines indicating that the spill has been removed or recovered.

16. A method of managing machine movements on a worksite, comprising:
- receiving a spill indication notification from a first machine of a plurality of machines operating at the worksite, wherein the spill indication notification comprises a time of a spill of material from the first machine and a location of the spill of the material, wherein the spill indication notification is generated by:
  - receiving a video signal generated by a camera mounted on the first machine of the plurality of machines, a ranging signal generated by a ranging apparatus mounted on the first machine of the plurality of machines, and an inertial measurement output generated by an inertial measurement unit mounted on the first machine of the plurality of machines;
  - determining if the spill of the material has occurred based on the video signal and the ranging signal; and
  - upon determining that the spill of the material has occurred, outputting the spill indication notification; and
- transmitting a site spill message to a second machine of the plurality of machines to warn the second machine of the spill of the material, wherein the second machine is proximate to or traveling along a path in which the spill of the material has occurred.

17. The method of claim 16, further comprising transmitting a movement instruction to the second machine based on the spill of the material, wherein the movement instruction comprises a command to the second machine to move to a second work path, to slow down a speed of the second machine, or for the second machine to travel along a second portion of the path to avoid the spill.

18. The method of claim 16, further comprising identifying the material by:
- comparing the video signal against a plurality of images;
- finding an image match between the video signal and one of the plurality of images; and
- identifying the material based on the image match.

19. The method of claim 16, further comprising:
- transmitting an instruction to a spill cleaning or recovery system to remove or recover the spill; and
- transmitting a site spill clear message to the plurality of machines indicating that the spill has been removed or recovered.

20. The method of claim 19, further comprising transmitting a second movement instruction to the plurality of machines to recommence using the path.

* * * * *